(12) United States Patent
Cho et al.

(10) Patent No.: US 7,914,594 B2
(45) Date of Patent: Mar. 29, 2011

(54) AIR FILTERING DEVICE AND CLEANING SYSTEM OF SEMICONDUCTOR MANUFACTURING APPARATUS WITH THE SAME

(75) Inventors: Chang-Min Cho, Gyeonggi-do (KR); Joo-Young Kim, Seoul (KR); Ji-Young Kim, Gyeonggi-do (KR); Ju-A Ryu, Seoul (KR); Yo-Han Ahn, Gyeonggi-do (KR); Hyung-Seok Choi, Gyeonggi-do (KR); Dong-Seok Ham, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 12/180,289

(22) Filed: Jul. 25, 2008

(65) Prior Publication Data
US 2009/0025565 A1 Jan. 29, 2009

(30) Foreign Application Priority Data
Jul. 25, 2007 (KR) .................. 10-2007-0074586

(51) Int. Cl.
*B01D 46/00* (2006.01)
(52) U.S. Cl. ............... 55/309; 55/410; 55/417; 55/418; 55/419; 55/385.2; 55/495; 55/497; 55/500; 55/502; 55/DIG. 31; 454/49; 454/67
(58) Field of Classification Search .............. 55/309, 55/410, 417–419, 385.2, 495, 497, 500, 502, 55/DIG. 31, 483; 454/49–67
See application file for complete search history.

(56) References Cited

U.S. PATENT DOCUMENTS

| | | | | |
|---|---|---|---|---|
| 5,064,457 A | * | 11/1991 | Weber | ............... 55/385.2 |
| 5,389,120 A | * | 2/1995 | Sewell et al. | ............... 96/233 |
| 5,752,985 A | * | 5/1998 | Nagafune et al. | ............... 29/25.01 |
| 5,952,985 A | | 9/1999 | McKinney et al. | |
| 6,451,091 B1 | * | 9/2002 | Avina | ............... 95/107 |
| 6,676,505 B2 | * | 1/2004 | Behl | ............... 454/184 |

(Continued)

FOREIGN PATENT DOCUMENTS

JP 9-180974 7/1997

(Continued)

OTHER PUBLICATIONS

English language abstract of Japanese Publication No. 9-180974.

(Continued)

*Primary Examiner* — Jason M Greene
*Assistant Examiner* — Dung Bui
(74) *Attorney, Agent, or Firm* — Stanzione & Kim, LLP

(57) ABSTRACT

An air filtering device and an air cleaning system of a semiconductor manufacturing apparatus to reduce cost and increase manufacturing productivity. The air filtering device may include a frame having an open aperture coupled to an air supply line. A buffer frame configured to be inserted into the frame may include a plurality of slot parts, each slot part having a plurality of air in/out apertures through which air may flow in or out from the buffer frame. A plurality of filters may be releasably fastened to the plurality of slot parts to filter pollution material contained in air flowing through the air in/out apertures. An air interrupter for interrupting air flowing through the air in/out apertures may be used when replacing the plurality of filters, thereby providing purified air to the semiconductor manufacturing apparatus during the replacement.

17 Claims, 4 Drawing Sheets

U.S. PATENT DOCUMENTS

| | | | |
|---|---|---|---|
| 6,723,148 B2 * | 4/2004 | Stass .......................... | 55/385.3 |
| 7,332,016 B2 * | 2/2008 | Costura et al. .................. | 95/20 |
| 7,442,218 B2 * | 10/2008 | Okubo et al. ............... | 55/282.3 |
| 7,637,974 B2 * | 12/2009 | Scholl et al. ................... | 55/340 |
| 2004/0000129 A1 * | 1/2004 | Ishihara et al. ............. | 55/385.1 |
| 2006/0148397 A1 * | 7/2006 | Schultz et al. ................ | 454/56 |

FOREIGN PATENT DOCUMENTS

| | | |
|---|---|---|
| JP | 10-211419 | 8/1998 |

OTHER PUBLICATIONS

English language abstract of Korean Publication No. 10-211419.

* cited by examiner

AIR FILTERING DEVICE AND CLEANING SYSTEM OF SEMICONDUCTOR MANUFACTURING APPARATUS WITH THE SAME

CROSS REFERENCE TO RELATED APPLICATIONS

This application claims priority under 35 U.S.C. §119 from Korean Patent Application 10-2007-0074586, filed on Jul. 25, 2007, the contents of which are hereby incorporated by reference in their entirety for all purposes as if fully set forth herein.

BACKGROUND OF THE INVENTION

1. Field of the Invention

The present invention relates to cleaning systems of semiconductor manufacturing apparatuses, and more particularly, to an air filtering device and a cleaning system of a semiconductor manufacturing system, which is capable of increasing productivity by replacing a filter in the midst of process.

2. Description of the Related Art

Recent rapid development on the semiconductor manufacturing technology brings about the active research to prevent a process error and increase a production yield. It is therefore essential to heighten an air purity level of a clean room, which can greatly influence the yield of semiconductors. The clean room is generally adapted to achieve as close to a particle-free environment as possible, and serves as an independent space from a peripheral environment to perform a wafer manufacturing process by suppressing a particle occurrence in a standard amount of air. To maintain proper controls, the clean room is isolated from the outside and is controlled independently of temperature and humidity. In the clean room, air capable of removing particles is circulated and supplied. The clean room is controlled to have an air purity level of about 1000 class or below, thereby containing about 1000 or less particles within 1 $m^3$ thereof.

Further, a semiconductor manufacturing apparatus, in which a semiconductor fabricating process is performed, requires even better air purity, i.e., about 100 class or below, thereby containing about 100 or less particles within 1 $m^3$. Thus, the semiconductor manufacturing apparatus is designed to receive clean air through a specific air cleaning system of the clean room.

For example, in an exposure apparatus that photosensitizes photoresist formed on a wafer, air of high purity must be supplied to fore and rear parts of a plurality of reduction lenses for reducing and projecting a predefined pattern formed on a reticle. Thus, an air filtering device is adapted to filter air supplied to an air supply line coupled to a housing (clean bench) that surrounds the exposure apparatus. Also, a fan for blowing air supplied through the air filtering device by a predefined pressure, and a muffler for reducing noise generated in the fan, are adapted therein.

However, when particles flow into the air filtering device through the muffler, the air filtering device may be polluted and its life shortened. Further, the air filtering device installed near the exposure apparatus is supplied at a high cost—e.g., more than tens of thousands dollars to remove micro particles and alkaline material.

Thus, to protect the air filtering device, another air filtering device to primarily remove the particles must be additionally disposed at a fore part of the fan, in place of the muffler. In this manner, the air filtering device disposed before the fan may reduce noise generated in the fan. Furthermore, the air filtering device disposed before the fan is easy to be exposed to the particles, so its life is short, and should be replaced frequently. However, it is difficult and costly to stop a semiconductor fabricating process to perform a filter replacement of the air filtering device.

An air cleaning system of a semiconductor manufacturing apparatus according to a conventional art is hindered by problems. First, a large quantity of particles flow through a muffler that is disposed at a fore part of a fan blowing air of predefined pressure to an air filtering device, which reduces noise of the fan. But as a result, the life of the air filtering device supplied at a high cost may be shortened with a resulting decrease in productivity. Second, in an air cleaning system of a semiconductor manufacturing apparatus according to a conventional art, the life of the air filtering device adapted at a fore part of the fan is shortened, causing a process of the semiconductor manufacturing apparatus to stop whenever a filter replacement of the air filtering device is required. This, in turn, causes a drop in productivity.

SUMMARY OF THE INVENTION

Some example embodiments of the invention provide an air filtering device and an air cleaning system capable of intercepting an inflow of particles from a fore part of a fan to reduce cost and increase manufacturing productivity.

According to an example embodiment of the invention, an air filtering device may comprise a frame having an open aperture coupled to an air supply line, a buffer frame configured to be inserted into or otherwise coupled to the frame, a plurality of slot parts, each slot part having a plurality of in/out apertures configured to permit air flow through the buffer frame, a plurality of filters, each filter being releasably fastened to one of the plurality of slot parts, and configured to filter pollution material contained in the air flow, and an air interrupter configured to interrupt the air flow through the in/out apertures of at least one of the slot parts during a replacement of a corresponding one of the plurality of filters.

The air interrupter may comprise a slide panel, and the buffer frame may comprise an interrupter in/out aperture into which the slide panel is inserted. The air filtering device may further comprise a filter cover for covering the exterior of the plurality of filters and fixing the plurality of filters to the buffer frame.

According to another example embodiment of the invention, a cleaning system may comprise a housing surrounding a periphery part of a semiconductor manufacturing apparatus to provide an enclosed space independent of a clean room, a fan configured to supply air at a predefined pressure, a first air filtering unit coupled to the fan, the first air filtering unit having a first air filter configured to filter first pollution material from air supplied between the fan and an inside of the housing, and a second air filtering unit coupled to the fan, the second air filtering unit having a plurality of releasably fastened second air filters configured to filter second pollution material from air supplied to the fan, the second air filters being replaceable without ceasing the supply of air through the fan in the midst of operating the semiconductor manufacturing apparatus As described above, according to some example embodiments of the invention, a second air filtering unit may be installed in a fore part of the fan and air flow controller to intercept many particles flowing into the fore part of the fan, thereby reducing replacement expenses of the first air filtering unit supplied at a high cost, thereby reducing cost and increasing manufacturing productivity.

In addition, in a second air filtering unit adapted in a fore part of fan, an air interrupter is provided to individually interrupt air flowing through a plurality of fifth filters and sequentially replace the plurality of fifth filters, thereby preventing a semiconductor manufacturing apparatus and an air cleaning system from stopping the operation thereof causable by a replacement of fifth filter, resulting in an increase of productivity.

BRIEF DESCRIPTION OF THE DRAWINGS

The above and other features of some example embodiments of the invention will become readily apparent from the description that follows, with reference to the attached drawings in which.

DETAILED DESCRIPTION

Embodiments of the present invention now will be described more fully hereinafter with reference to the accompanied drawings, in which embodiments of the invention are shown. This invention may, however, be embodied in many different forms and should not be construed as limited to the embodiments set forth herein. Rather these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. Exemplary embodiments of the present invention are more fully described below with reference to the accompanied drawings. This invention may, however, be embodied in many different forms and should not be construed as being limited to the exemplary embodiments set forth herein; rather, these exemplary embodiments are provided so that this disclosure is thorough and complete, and conveys the concept of the invention to those skilled in the art. For purposes of clarity, a detailed description for other illustrations and publication methods and procedures, has been omitted.

According to some example embodiments of the invention, an air filtering device and an air cleaning system of a semiconductor manufacturing apparatus employing the same are described as follows.

Figure 1:
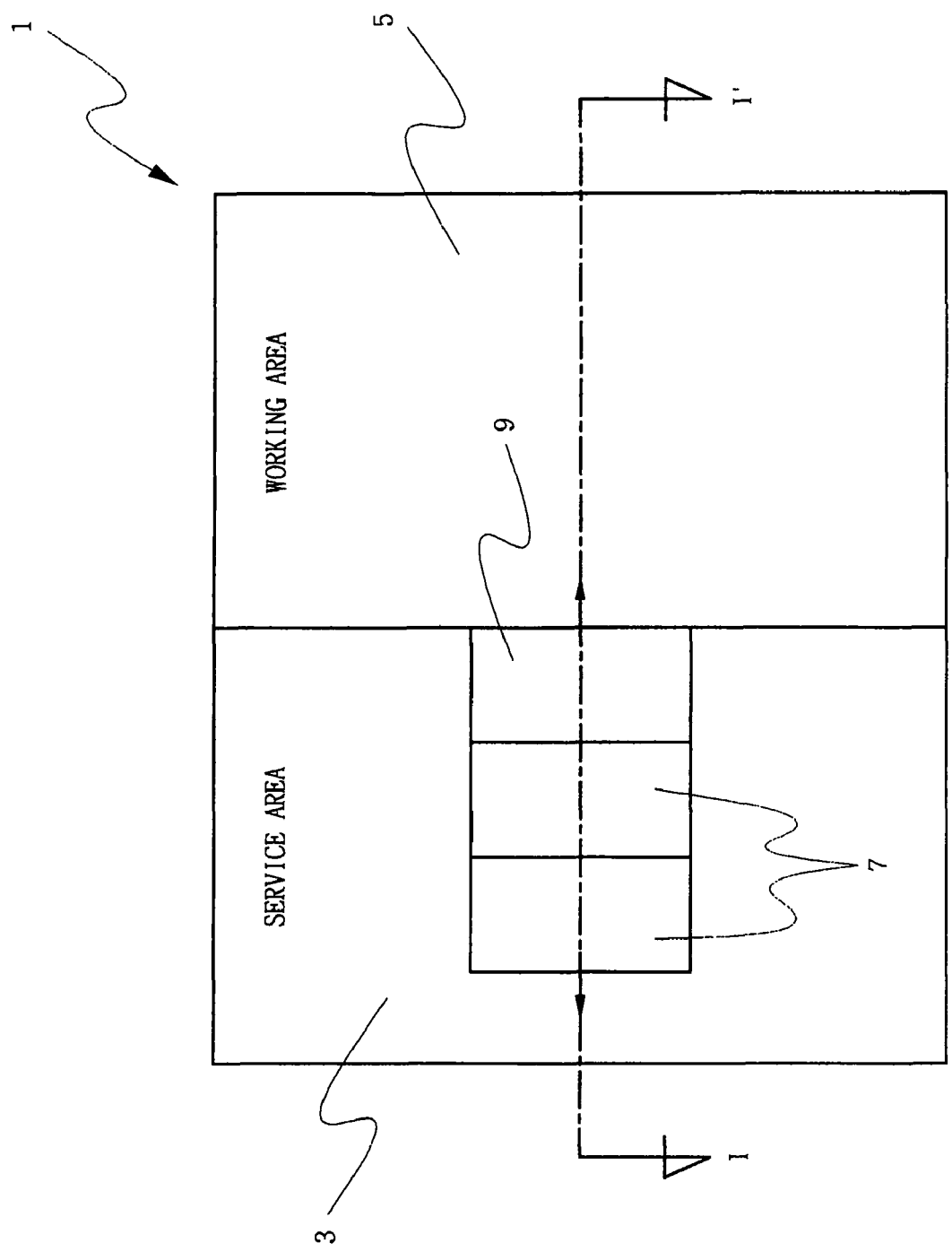
FIG. 1 is a plan view schematically illustrating a clean room for use in an air cleaning system of a semiconductor manufacturing apparatus according to an example embodiment of the invention.

FIG. 1 is a plan view schematically illustrating a clean room in an air cleaning system of a semiconductor manufacturing apparatus according to an example embodiment of the invention. A clean room 1 may comprise a working area 5 and a service area 3.

The working area 5 may be called herein a bay, where a carrier having mounted-wafers (W of FIG. 3) moves by a worker or robot. The service area 3 comprises a unit process region on which a semiconductor apparatus performing each unit process of wafers W conveyed from the working area 5 is disposed. The unit process region includes a wafer process area 7 where a predefined work for the wafer W is performed, and a wafer transfer area 9 where the wafer W is loaded on or unloaded from the wafer process area 7.

When the carrier on which the wafer W is mounted is transferred by a worker or convey device from the working area 5 to the wafer transfer area 9, a robot of the wafer transfer area 9 loads the wafer W one by one to the wafer process area 7. The robot placed in the wafer transfer area 9 performs a work of loading the wafer W to the wafer stage and unloading the wafer W completed in the process from the wafer process area 7.

The clean room 1 is designed to maintain a high air pressure as compared with outside air so as not to produce an air inflow from the outside. The air pressure of the working area 5 is made higher than the service area 3, thereby preventing micro particles generated in the service area 3 from flowing into the working area 5 due to a pressure difference. The pressure difference is achieved by controlling the amount of clean air flowing in the working area 5 and the service area 3. The wafer transfer area 9 and the wafer process area 7 within the service area 3 are configured to have an air pressure higher than the working area 5.

Figure 2:
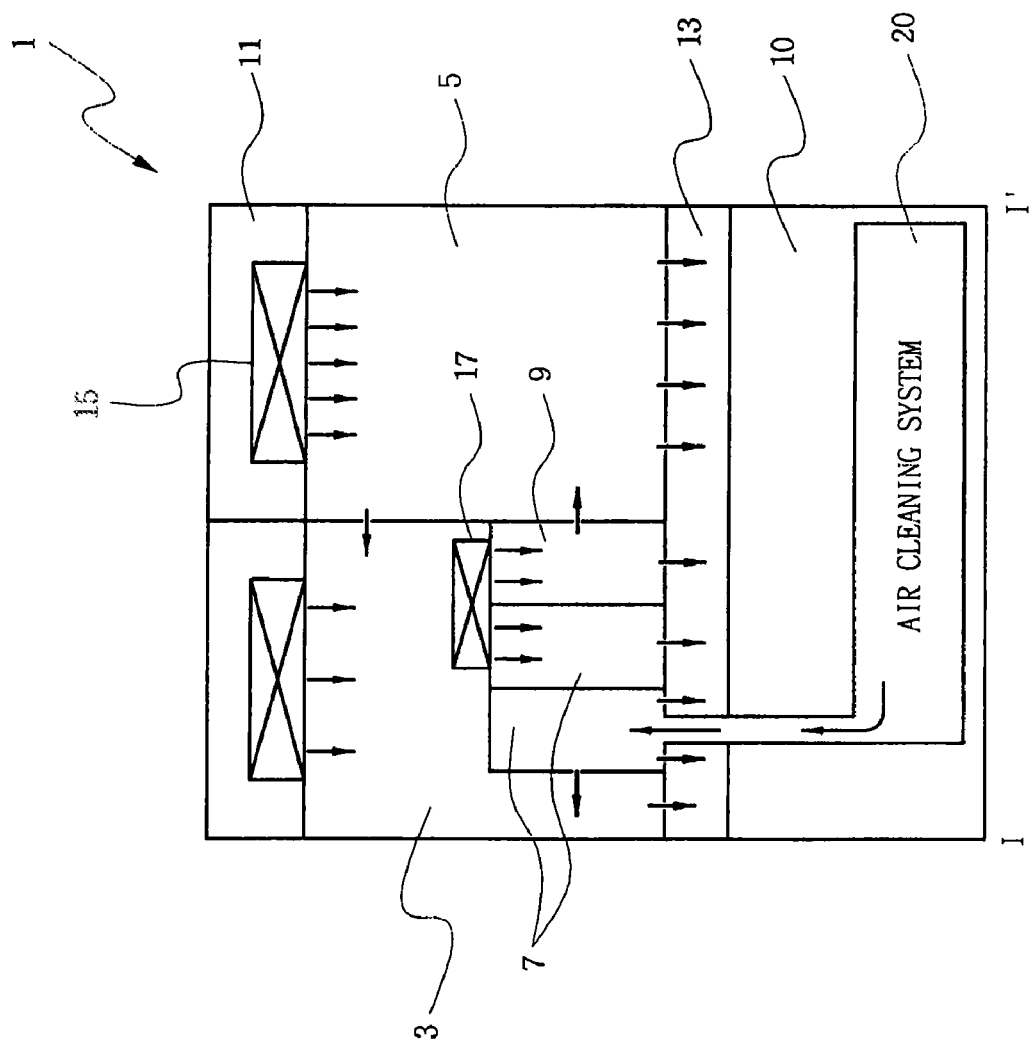
FIG. 2 is an elevation view taken along a line I~I' of FIG. 1.

FIG. 2 is an elevation view taken along a line I~I' of FIG. 1. Within the clean room 1, an upper plenum 11 for supplying a first cleaned air is disposed in an upper part thereof, and a lower plenum 13 for collecting air passed through the clean room 1 is disposed in a lower part of the clean room 1 opposite to the upper plenum 11.

The upper and lower plenums 11 and 13 are configured to circulate and supply clean air of a predefined flow speed in upper and lower parts of the clean room 1. For example, the upper plenum 11 includes a first air filter 15 for purifying air supplied within the clean room 1. The lower plenum 13 includes a grating that has a plurality of openings for exhausting air passed through the clean room 1. That is, the clean room 1 is formed so that air purified through the upper and lower plenums 11 and 13 is circulated and supplied; thus, the clean room 1 is provided as a space independent of the outside.

The service area 3 of the clean room 1 is configured to supply more purified air using a filtering of a second air filter 17. A fan (not shown) for blowing air filtered for pollution material through the second air filter 17 by a predefined pressure to the service area 3 may be used.

Here, when an exposure apparatus sensitive to an air flow speed is configured within the wafer process area 7 of the service area 3, the exposure apparatus may be managed by an air cleaning system 20 to supply clean air. Though the air cleaning system 20 may be installed within the clean room 1 where the corresponding semiconductor apparatus is disposed, it may be installed in another clean room 1 interlocked with the clean room 1.

According to an example embodiment of the invention, the air cleaning system 20 adapted to supply air purified in a lower clean room 10 is described as follows. The lower clean room 10 may be disposed in a lower part of the clean room 1 where a semiconductor manufacturing apparatus is installed.

Figure 3:
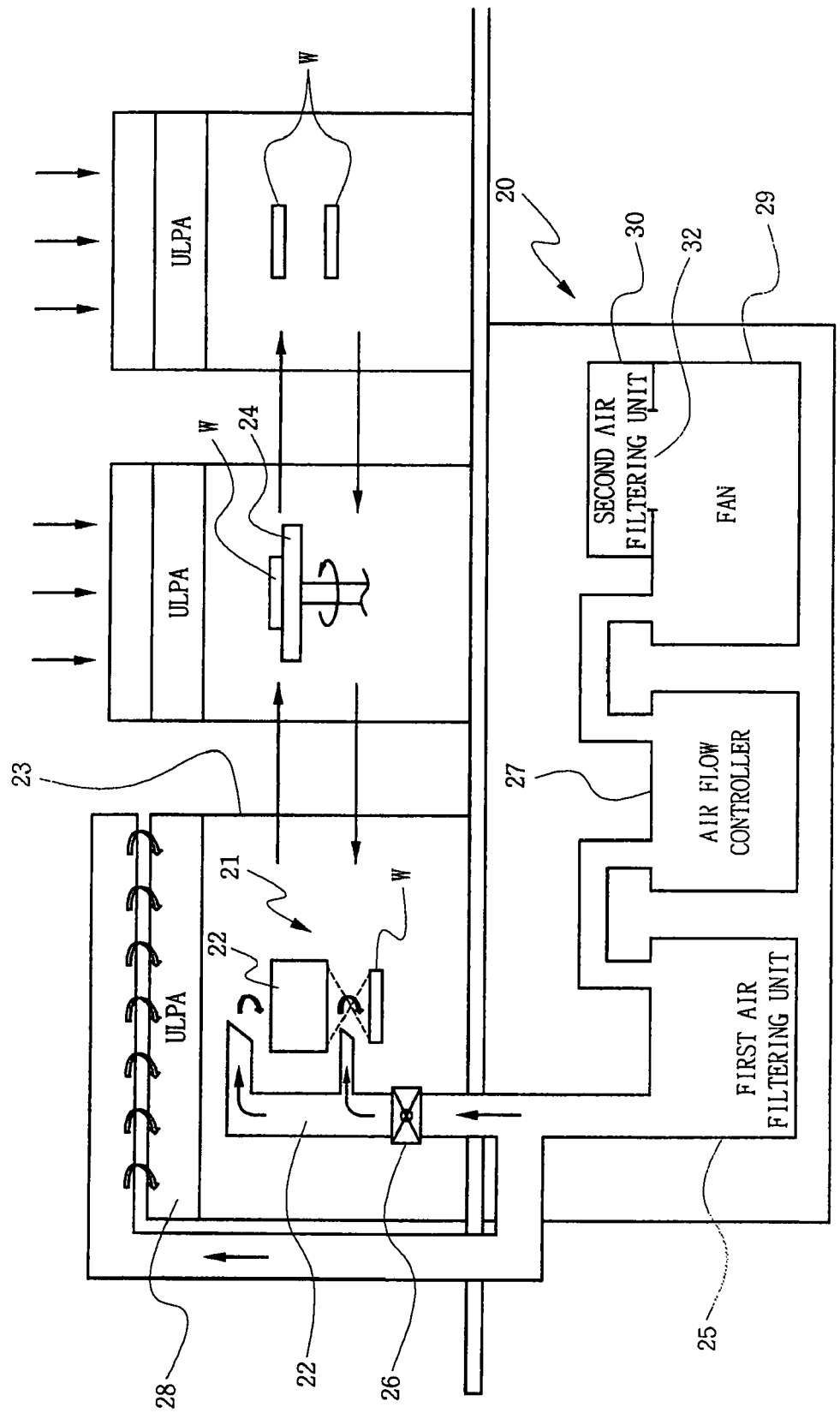
FIG. 3 schematically illustrates an air cleaning system of a semiconductor manufacturing apparatus according to an example embodiment of the invention.

FIG. 3 schematically illustrates the air cleaning system 20 of a semiconductor manufacturing apparatus according to some example embodiments of the invention. Referring to FIG. 3, air cleaning system 20 of a semiconductor manufacturing apparatus comprises a semiconductor manufacturing apparatus 21 for performing a precise fabrication process of a semiconductor such as an exposure apparatus. The air cleaning system 20 may include a housing 23 surrounding an outer periphery of the semiconductor manufacturing apparatus 21, and provided as a space independent of the clean room 1, or outside clean room 1. A first air filtering unit 25 for purifying air supplied within the housing 23 may be included in the lower clean room 10 as a unit of the air cleaning system 20. An air flow controller 27 may be coupled to the first air filtering unit 25 to control a flow amount of air purified through the first air filtering unit 25. A fan 29 may be configured to blow air of a predefined pressure to the air flow controller 27. A second air filtering unit 30 may be configured to purify air supplied to the fan 29, the second air filtering unit 30 being replaceable, even during an operation of the semiconductor manufacturing apparatus 21.

The semiconductor manufacturing apparatus 21 may perform unit processes such as a deposition, patterning, or cleaning process to form a predefined pattern on wafer W. In particular, in an exposure apparatus, a reduction projection lens may be used for reducing and projecting a predefined pattern formed on a reticle. In the exposure apparatus, the reduction projection lens is cooled by air of high purity flowing with a predefined flow amount. Thus, air supplied to the exposure apparatus must be highly purified through the first and second air filtering units 25 and 30, respectively, and a flow amount thereof may be precisely controlled by the air flow controller 27. Meanwhile, a spinner 24 may be configured to cover photoresist on an entire face of wafer W. The wafer W may be exposed to air circulated and supplied within the clean room 1.

The housing 23 may be an independent space within the service area 3 of the clean room 1. An air line 22 coupled to the first air filtering unit 25 may extend into the inside of the housing 23. The housing 23 may include a third filter 28 for purifying air exhausted from the air line 22 coupled to an upper part of the housing 23. The third filter 28 is preferably the filter of trademark "ULPA" that can filter 99.999% or more of particles of about 1.2~1.7 μm in size at a very high efficiency. A pressure reduction device POU 26 may be included in the air line 22 to compensate for an air pressure generated by the third filter 28. Thus, the housing 23 may be configured so that air pressure filtered for pollution material by the first and second air filtering units 25 and 30, respectively, is reduced to a predefined pressure through the third filter 28 and the pressure reduction device 26. As a result, the housing 23 can provide required temperature and purity levels required by the semiconductor manufacturing apparatus 21 such that air flows therein and forms a balanced air stream to operate the semiconductor manufacturing apparatus 21 in a relatively efficient state.

The first air filtering unit 25 may include a fourth filter (not shown) to neutralize chemical material such as alkaline pollution material from air supplied to the semiconductor manufacturing apparatus 21, and also to remove particles having a predefined or higher size. Where alkaline pollution material flows into the semiconductor manufacturing apparatus 21, the reduction projection lens may be stained, or a characteristic of photoresist pattern may be deteriorated. For example, the fourth filter may be an ultrahigh efficiency filter capable of filtering particles of about 1.2~1.7 μm size by 99.999% or more, like the third filter 28, and may include activated-carbon that neutralizes alkaline pollution material. The fourth filter may be replaced with a new filter approximately every six months so long as the second air filtering unit 30 performs a normal filtering operation. Accordingly, the first air filtering unit 25 is a main air filtering device for finally removing pollution material of air supplied to the semiconductor manufacturing apparatus 21 within the housing 23 and for guiding the air to the air line 22.

The air flow controller 27 may control an air pressure supplied to the first air filtering unit 25 and decide how much purified air may flow in the first air filtering unit 25. The air flow controller 27 may comprise at least one pressure control valve.

The fan 29 may be configured to generate an air pressure by force to suck the air by a predefined suction force from the second air filtering unit 30 and blow the air by a predefined exhaust force to the air flow controller 27 and the first air filtering unit 25. For example, the fan 29 is constructed of an impeller for producing a flow of air and a casing to guide a flow of air that flows in and out of the impeller. The fan 29 may comprise an axial-flow fan, radial-flow fan, mixed-flow fan, based on flow characteristics of air passing through the impeller. The axial-flow fan blows air in a direction paralleled with a rotary axis of impeller, and requires a high amount of air flow, but not so much pressure. The radial-flow fan is mainly targeted to increasing pressure through a centrifugal force, and thus principally requires more pressure as compared with the amount of air flow. The mixed-flow fan, for which a flow of air exists in an axial direction and radial direction together within the impeller, may be used when an increase of air flow amount and pressure is simultaneously needed. Thus, to blow air of a predefined or higher pressure to the first air filtering unit 25, the radial-flow fan may be employed.

The second air filtering unit 30 may purify air prior to supplying the air to the first air filtering unit 25 using the fan 29. This helps to increase a life cycle of the first air filtering unit 25. Because the first air filtering unit 25 may be relatively costly, using the second air filtering unit 30 may reduce a cost burden associated with replacing the first air filtering unit 25.

In the air cleaning system 20, the second air filtering unit 30 may be disposed near a fore part of the fan 29 and the air flow controller 27, thus many particles flowing in the front part of the fan 29 can be intercepted prior to reaching the first air filtering unit 25, thereby reducing a replacement cost of the first air filtering unit 25 and increasing productivity.

The second air filtering unit 30 may be exposed to air within the clean room 1, and is easily polluted by a pollution source; thus, the life thereof is shortened and requires often replacement with a new one. Therefore the second air filtering unit 30 is designed to be easily replaceable, even without interrupting an operation of the semiconductor manufacturing apparatus 21 and the air cleaning system 20.

Figure 4:
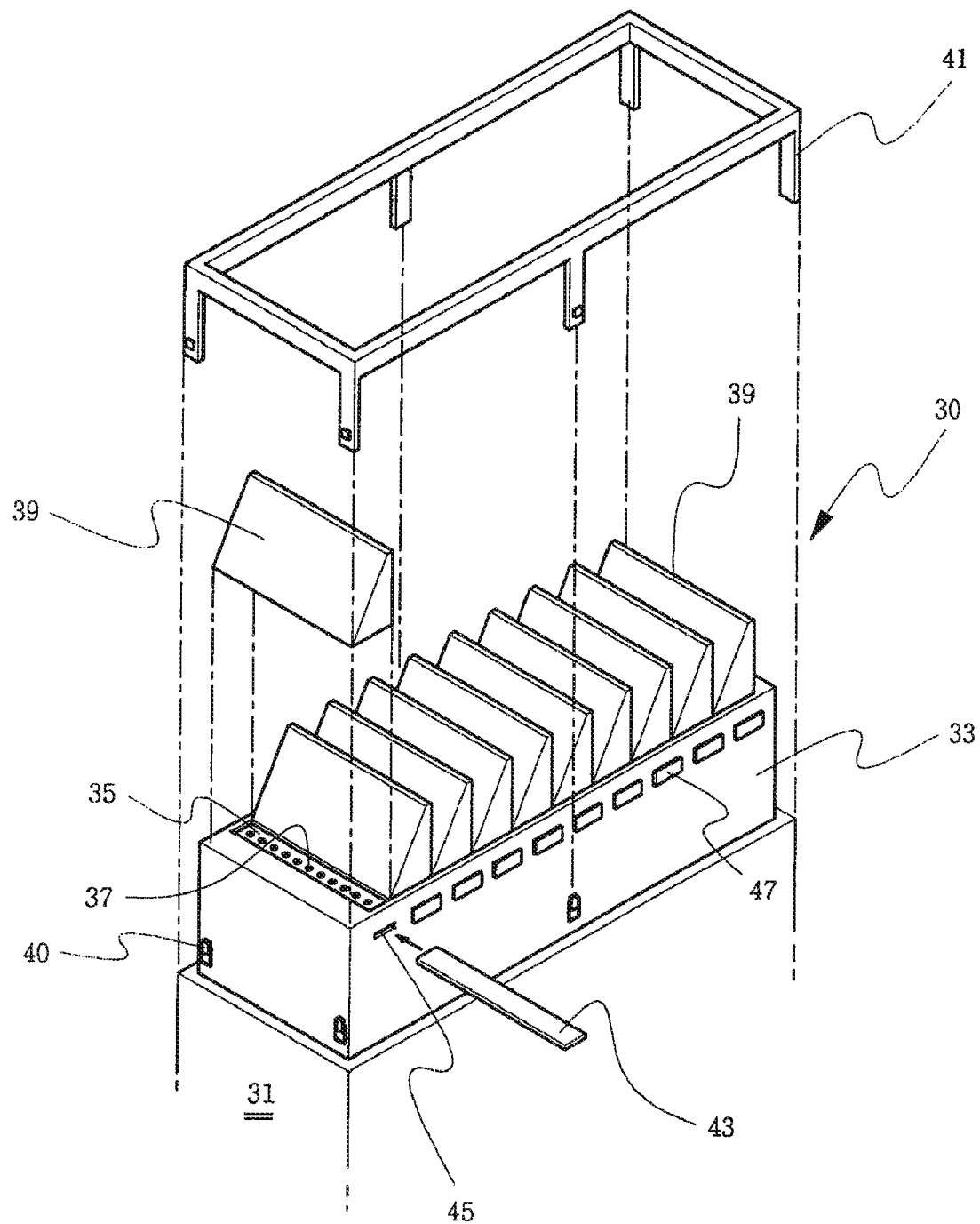
FIG. 4 is a perspective view illustrating in detail a second air filtering unit of FIG. 3.

FIG. 4 is a perspective view illustrating in detail the second air filtering unit 30 of FIG. 3. As shown in FIG. 4, the second air filtering unit 30 may comprise a main frame 31, a buffer frame 33, a plurality of slot parts 35, a plurality of fifth filters 39, a filter cover 41 and an air interrupter 43.

In the main frame 31, an air supply line may be formed, through which air blowing from the fan 29 is supplied. The main frame 31 may have an aperture 32, which is substantially the same size as an opening of the fan 29. The buffer frame 33 may be formed such that it can be inserted in the main frame 31. The plurality of slot parts 35 may be formed with a plurality of air in/out apertures 37, through which air may flow in or out of the buffer frame 33.

The plurality of fifth filters 39 may be disposed on the plurality of slot parts 35 to filter pollution material contained in air that flows in and out through the air in/out apertures 37. The filter cover 41 may be configured to cover an outer part of the plurality of fifth filters 39 and may be releasably secured to the buffer frame 33. The air interrupter 43 may be formed such that it can be inserted between one of the fifth filters 39 and the slot part 35 to interrupt a flow of air flowing through the air in/out apertures 37 when replacing one of the plurality of fifth filters 39.

With respect to the main frame 31, the buffer frame 33 may be included in the inside thereof, and a plurality of fifth filters 39 releasably fastened to the buffer frame 33, thereby exposing the plurality of fifth filters 39 externally. When replacing one of the fifth filters 39, although the in/out aperture 37 is exposed, air flow through the in/out aperture 37 is configured to be interrupted using the air interrupter 43.

The main frame 31 may be formed using a rectangular box shape whose inside is substantially vacant. The buffer frame 33 may be configured so that the plurality of fifth filters 39 are inserted into the inside of the main frame 31. That is, in the buffer frame 33, a plurality of slot parts 35 with which the plurality fifth filters 39 are releasably fastened, may be regularly arranged in a single direction, and a plurality of clips (not shown) may be adapted to individually fasten the plurality of fifth filters 39 with the buffer frame 33. For example, the buffer frame 33 may be inserted by a predefined depth into the main frame 31, and may have a rectangular box shape to be inserted and mounted on the bottom of the main frame 31. The main frame 31 and the buffer frame 33 may allow air to be induced through the plurality of fifth filters 39 and to enable an air flow therein. The flow of air passing through the plurality of fifth filters 39 may be concentrated on a center portion of the buffer frame 33. The plurality of holes (i.e. the air in/out apertures 37) are formed along the slot part 35 to disperse an air pressure that is sucked into the inside of the buffer frame 33 through the plurality of fifth filters 39. The plurality of holes 37 buffer the air pressure passing through the plurality of fifth filters 39 so that a constant air pressure may be applied substantially evenly across a plane face of the buffer frame 33.

In some example embodiments, the plurality of fifth filters 39 are configured to purify air supplied to the fan 29, the air flow controller 27, and the first air filtering unit 25. The plurality of fifth filters 39 may include activated-carbon that neutralizes alkaline gas with a predefined or higher density, and a filtering mesh for filtering particles of about 10 µm or more size. The plurality of fifth filters 39 may be formed with a plurality of mountain shapes to reduce the air pressure from which pollution material has been removed, and to increase an exposed surface area protruded by a predefined height in a direction opposite the slot parts from an upper part of the buffer frame 33. Thus, a filter cover 41 may be adapted to cover the upper part of the plurality of fifth filters 39 disposed on the buffer frame 33, and to releasably secure the plurality of fifth filters 39 to the buffer frame 33. The filter cover 41 may be contacted with or adjacent to the buffer frame 33, and may be coupled with the buffer frame 33 using a catch clip 40.

The plurality of fifth filters 39 may be exposed to a large amount of pollution material generated in air or the clean room 1, thus the life thereof is shortened. Preferably, the plurality of fifth filters 39 may be replaced with new ones more often than the first air filtering unit 25. Particularly, the plurality of fifth filters 39 may be individually interrupted by the air interrupter 43 and sequentially replaced with new ones.

In some example embodiments, the air interrupter 43 can individually interrupt a flow of air passing through at least one of the plurality of fifth filters 39. For example, the air interrupter 43 may be formed of a slide panel that has a width substantially the same as the slot part 35 and a length substantially corresponding to a length of the fifth filter 39, or a slightly or substantially larger length. The slide panel may be formed of metal or plastic material with a shape of rectangular sectional face. When replacing one of the plurality of fifth filters 39, the air interrupter 43 may first interrupt the air flow passing through the slot part 35 of the buffer frame 33. After replacing an old fifth filter with a new one, air can again flow through the slot part 35 upon removal of the air interrupter 43. On a side face of the buffer frame 33 adjacent to the slot part 35, interrupter in/out apertures 45 may be formed. To prevent air flow in and out through the interrupter in/out aperture 45 when the air interrupter 43 is not fastened to the interrupter in/out aperture 45, the interrupter in/out aperture may be sealed using a rubber pad 47, and can be opened only when the air interrupter 43 is inserted. The filter cover 41 may be removed from the upper part of the plurality of fifth filters 39, and the rubber pad 47 fastened to the interrupter in/out aperture 45 may be released. Then, the air interrupter 43 may be inserted into the interrupter in/out aperture 45 so that one of the fifth filters 39 associated with the inserted air interrupter 43 can be replaced. Afterward, the air interrupter 43 may be extracted from the interrupter in/out aperture 45, and the rubber pad 47 re-fastened to the interrupter in/out aperture 45. Thus, the plurality of fifth filters 39 can be sequentially replaced during an operation of the semiconductor manufacturing apparatus 21.

Accordingly, air cleaning system 20 of semiconductor manufacturing apparatus 21 may employ the air interrupter 43 for individually interrupting air flowing through one or more fifth filters 39 in the second air filtering unit 30 adapted on a fore part of the fan 29 so that the plurality of fifth filters 39 can be sequentially replaced. This increases manufacturing productivity by enabling the semiconductor manufacturing apparatus 21 to safely continue operating without stopping while replacing the plurality of fifth filters 39.

As described above, according to some example embodiments of the invention, a second air filtering unit may be installed in a fore part of the fan and air flow controller to intercept many of the particles flowing into the fore part of the fan, thereby reducing replacement expenses of a costly first air filtering unit, while simultaneously increasing manufacturing productivity.

In addition, an air interrupter may be provided to individually interrupt air flowing through at least one of a plurality of fifth filters and each of the fifth filters may be sequentially replaced, thereby preventing a semiconductor manufacturing apparatus and an air cleaning system from stopping to operate; thus, manufacturing productivity may be increased.

It will be apparent to those skilled in the art that modifications and variations can be made in the present invention without deviating from the spirit or scope of the invention. Thus, it is intended that the present invention cover any such modifications and variations of this invention provided they come within the scope of the appended claims and their equivalents. For example, it does not matter to adapt an air cleaning system of a semiconductor manufacturing apparatus at any limited space inside or outside a clean room. Accordingly, these and other changes and modifications are seen to be within the true spirit and scope of the invention as defined by the appended claims.

In the drawings and specification, there have been disclosed typical embodiments of the invention and, although specific terms are employed, they are used in a generic and descriptive sense only and not for purposes of limitation, the scope of the invention being set forth in the following claims.

We claim:

1. An air filtering device comprising:
   a frame having an open aperture coupled to an air supply line;
   a buffer frame coupled to the frame;

a plurality of slot parts, each slot part having at least one in/out aperture configured to permit air flow through the buffer frame;

a plurality of filters, each filter being releasably fastened to one of the plurality of slot parts, and configured to filter pollution material contained in the air flow; and an air interrupter configured to individually interrupt the air flow through the at least one in/out aperture of any one or more of the slot parts during a replacement of a corresponding one of the plurality of filters, the air interrupter including a slide panel having a width of one of (a) substantially the same as one of the slot parts and (b) larger than one of the slot parts.

2. The device of claim 1, wherein the plurality of filters comprise a plurality of mountain shapes protruding in a direction opposite to the slot parts.

3. The device of claim 1, wherein the buffer frame comprises at least two interrupter in/out apertures configured to individually receive the slide panel.

4. The device of claim 3, comprising at least two rubber pads, each rubber pad configured to seal one of the at least two interrupter in/out apertures.

5. The device of claim 1, comprising a filter cover configured to cover an exterior of the plurality of filters and to releasably secure the plurality of filters to the buffer frame.

6. The device of claim 5, wherein the buffer frame comprises a plurality of catch clips for coupling the filter cover to the buffer frame.

7. An air cleaning system, comprising:

a housing surrounding a periphery part of a semiconductor manufacturing apparatus to provide an enclosed space independent of a clean room;

a fan configured to supply air at a predefined pressure;

a first air filtering unit coupled to the fan, the first air filtering unit having a first air filter configured to filter first pollution material from air supplied between the fan and an inside of the housing; and a second air filtering unit coupled to the fan, the second air filtering unit having a plurality of releasably fastened second air filters configured to filter second pollution material from air supplied to the fan, the second air filters being replaceable without ceasing the supply of air through the fan in the midst of operating the semiconductor manufacturing apparatus, the second air filtering unit comprising:

an air filtering device, the air filtering device including a frame having an opening coupled to an air supply line through which the air is configured to flow;

a buffer frame coupled to the frame;

a plurality of slot parts, each slot part having at least one in/out aperture configured to permit air flow through the buffer frame, each of the plurality of second air filters being releasably fastened to one of the plurality of slot parts; and an air interrupter configured to individually interrupt the air flow through the at least one in/out aperture of any one or more of the slot parts during a replacement of a corresponding one of the plurality of second filters the air interrupter including a slide panel having a width of one of (a) substantially the same as one of the slot parts and (b) larger than one of the slot parts.

8. The system of claim 7, wherein the plurality of second filters comprise a plurality of mountain shapes protruding in a direction opposite to the slot parts.

9. The system of claim 7, wherein the semiconductor manufacturing apparatus and the housing are disposed in the clean room, and wherein the first air filtering unit, the fan, and the second air filtering unit are disposed in a lower part of the clean room.

10. The system of claim 7, wherein the housing comprises a third air filter disposed in an upper part of the housing, the third air filter being configured to purify air exhausted from an air line, the air line configured to provide an air flow coupling between an upper part of the semiconductor manufacturing apparatus, the first air filtering unit, and the third air filter; and a pressure reduction unit for reducing an air pressure supplied to the semiconductor manufacturing apparatus of the housing.

11. The system of claim 7, wherein the fan comprises a radial-flow fan.

12. The system of claim 7, wherein the buffer frame comprises at least two interrupter in/out apertures configured to individually receive the slide panel.

13. The system of claim 12, comprising at least two rubber pads, each rubber pad configured to seal one of the at least two interrupter in/out apertures.

14. The system of claim 7, comprising a filter cover configured to cover an exterior of the plurality of second filters and to releasably secure the plurality of second filters to the buffer frame.

15. The system of claim 14, wherein the buffer frame comprises a plurality of catch clips for coupling the filter cover to the buffer frame.

16. The system of claim 7, further comprising:

an air flow controller coupled between the first air filtering unit and the fan and configured to control an air flow amount between the first air filtering unit and the fan.

17. The system of claim 16, wherein the air flow controller comprises at least one pressure control valve.

* * * * *